United States Patent [19]
Walker

[11] 3,949,464
[45] Apr. 13, 1976

[54] CONTEMPORANEOUS INSERTION OF OVERLAPPING COILS

[75] Inventor: Robert G. Walker, Ossian, Ind.

[73] Assignee: Industra Products, Inc., Fort Wayne, Ind.

[22] Filed: Jan. 13, 1975

[21] Appl. No.: 540,675

[52] U.S. Cl............... 29/596; 29/205 D; 29/205 E; 29/606
[51] Int. Cl.² ..................................... H02K 15/085
[58] Field of Search ......... 29/596, 606, 605, 205 D, 29/205 E, 205 R

[56] References Cited
UNITED STATES PATENTS

| | | | |
|---|---|---|---|
| 3,402,462 | 9/1968 | Walker et al. | 29/596 |
| 3,525,147 | 8/1970 | Keiffer | 29/596 |
| 3,685,118 | 8/1972 | Payne et al. | 29/205 R |
| 3,722,063 | 3/1973 | Arnold | 29/596 |
| 3,845,548 | 11/1974 | Arnold | 29/596 |
| 3,857,171 | 12/1974 | Lund | 29/596 |

Primary Examiner—Carl E. Hall
Attorney, Agent, or Firm—Albert L. Jeffers; Roger M. Rickert

[57] ABSTRACT

Apparatus for assembling coils into the slots of stators and the like including a plurality of radially extending risers movable through a stator bore to lead pole coil groups into stator slots and a plurality of radially extending protuberances for urging trailing portions of the coils radially outwardly to provide slot space for other coils is disclosed wherein there are provided a plurality of upstanding fingers with an inner coil placed over a number of those fingers and an outer coil placed over different ones of the fingers so that the outer and inner coils overlap. The inner and outer coils are then moved into the bore and slots of a stator core with the leading end turn forming portion of the inner coil, lying intermediate of end turn forming portions of the outer coil and the trailing end turn forming portion of the outer coil lying intermediate end turn forming portions of the inner coil so that not only the inner coil, but also stator bore insulating wedges may be more readily assembled into the stator core.

19 Claims, 8 Drawing Figures

FIG.4
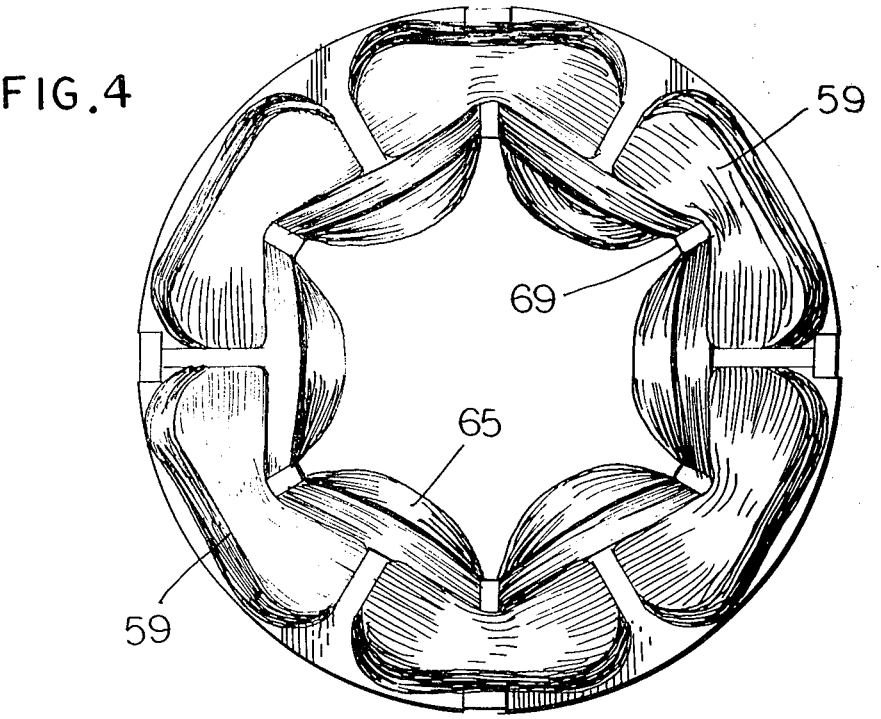
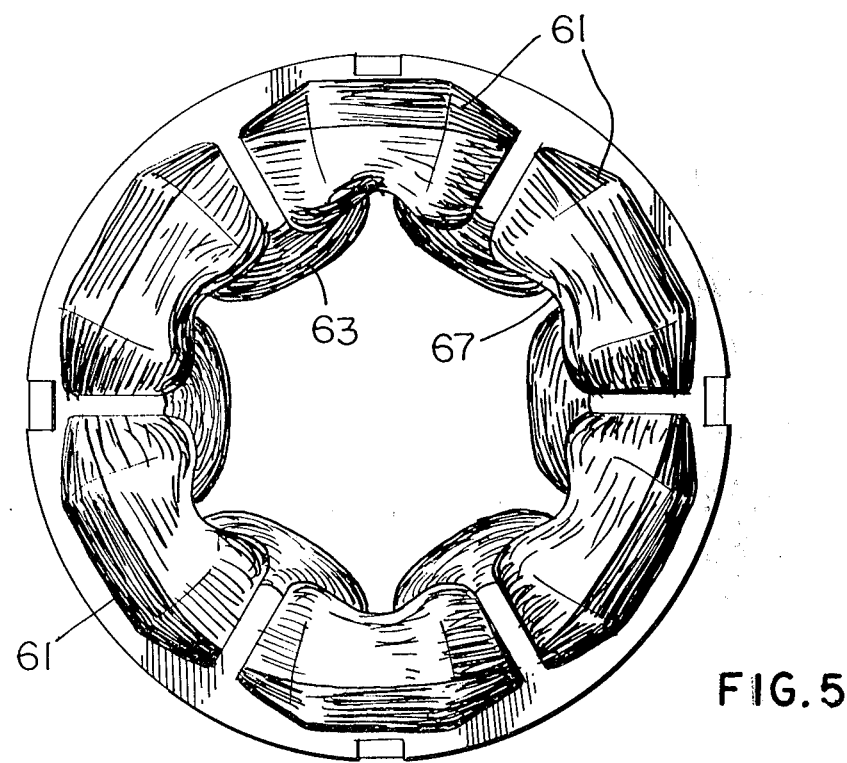
FIG.5

CONTEMPORANEOUS INSERTION OF OVERLAPPING COILS

BACKGROUND OF THE INVENTION

This invention relates generally to improved process and apparatus for assembling coils in the slots of stators or the like and more particularly to the insertion of overlapping coils during a single pass of the coil inserting apparatus.

As is known in the art, a dynamoelectric machine stator may comprise a slotted core of magnetic material having an axially extending rotor accepting bore therethrough and having a plurality of coils of conductive wire disposed in the slots with the coils between slots at either end of the core in end turn regions with certain ones of the coils being interconnected to form pole coil groups and those pole coil groups interconnected to form stator windings. Frequently both start and main windings will be provided with the start windings being electrically and/or physically displaced from the run windings to provide starting torque for the dynamoelectric machines. For example, an N-pole stator might typically have N main pole coil groups and N start pole coil groups with each of the start groups overlapping adjacent pairs of main groups. Such a stator may be provided with windings by forming those windings on coil forms, transferring the windings to a coil insertion device and displacing the windings from the coil insertion device into the stator slots.

Apparatus for inserting pre-wound coils into stator cores is well known in the art and represented for example, by U.S. Pat. Nos. 2,432,267 to Adamson and 3,324,536 to Hill. In using such apparatus to insert for example, in a first pass, a main winding, and in a subsequent pass, a start winding some difficulty may be experienced due to the lack of adequate space in the core for the second winding and for example, U.S. Pat. No. 3,402,462 to Walker et al teaches an ironing tool which is passed through the stator ahead of the second coil to force the first or main coil outwardly providing adequate slot space for the subsequent coil. A somewhat different approach is illustrated in U.S. Pat. No. 3,507,029 to Stuckey et al, which teaches a system for forming the rear end turns of the first coil radially outwardly to provide clearance for the subsequent insertion of additional coils into the slots of the stator core. Improved insertion of pre-wound coils employing machines of the type disclosed in the aforementioned Hill patent may also be achieved by modifying the movable stripper, which carries the coils into the stator core slots, in the manner taught in the U.S. Pat. No. 3,685,118 to Payne et al, or by attaching certain of the normally fixed upstanding blades or fingers which mesh with stator core teeth to the movable stripper as taught in U.S. Pat. No. 3,689,976 to Donavan. It is also known in the prior art to simultaneously insert both the main and start windings for example, in the manner taught in U.S. Pat. Nos. 3,625,261 to Hill et al and 3,845,548 to Arnold, and to move the main winding into the slots somewhat ahead of the start winding by using a riser above the normal stripper which engages only the main winding.

In the simultaneous or contemporaneous insertion of main and start windings the stripper pushes against the lower or inner winding which is generally the start winding and the upper or leading winding rides on the lower winding during insertion. Frictional forces on the upper winding as well as the lower winding accumulate and may tend to flatten the lower winding, particularly the lower portions thereof, spreading the blades or fingers and possibly locking up and damaging the equipment or the wires. Further the leading winding comes to rest in the stator core while the following or lower winding has an additional distance to travel and frictional forces exerted on it by the upper or outer winding, and particularly the lower end turns thereof, may be sufficient to break the wire or impair insertion. Bore insulating wedges typically accompany the inner winding during insertion and their placement may similarly be impaired.

Still further, a problem in both contemporaneous and sequential insertion of windings is that of locking wire size. When the ratio of wire diameter to blade gap is in the range of approximately 55% to 78% the relatively soft wire tends to deform slightly and act as a wedge with its adjacent wire. This wedging or nesting action produces side forces perpendicular to the blade surfaces which result in retarding frictional forces to the inserting process. Each wire in the coil will react in this manner and since the stripper is located at, and pushing from the bottom of the stack of wire, the frictional forces developed are cumulative. This is due to the fact that each wire develops it's own frictional force and must at the same time overcome the frictional retarding force of the wire directly above it. These accumulated forces present a retarding force at the stripper and for large numbers of turns may materially damage the wires directly adjacent or close to the stripper.

It is accordingly one object of the present invention to obviate one or more of the aforementioned problems.

Another object of the present invention is to improve the process of insertion employing machines of the type disclosed in the aforementioned Hill and Hill et al patents.

A further object of the present invention is to provide for the simultaneous insertion of main and start windings with reduced probability of damage to either the inserting equipment or the end product.

SUMMARY OF THE INVENTION

The foregoing as well as numerous other objects and advantages of the present invention are achieved by providing a machine for inserting coils of wire into slots of a dynamo-electric machine stator core, having a plurality of upstanding fingers supported on a machine frame and disposed about the circumference of a circle for supporting coils and having a stripper movable axially through a stator bore to push the coils through the bore and outwardly into core slots, capable of the contemporaneous insertion of at least a leading coil and an overlapping following coil and having means movable through the core bore ahead of the stripper for urging the leading coil through the bore somewhat ahead of the following coil and radially extending means for urging the trailing portion of the leading coil radially outwardly to aid in providing clearance for the following coil.

It is therefore a still further object of the present invention to aid the insertion of overlapping coils into stator slots by leading one of the coils through ahead of the other and urging outwardly the trailing end turn portion of the leading coil to provide additional clearance for the following coil.

Yet another object of the present invention is to achieve one or more of the foregoing objects by providing sets of risers having a like number of co-acting radially extending members, one set movable with the stripper and another set supported on the inserter frame.

The subject matter which I regard as my invention is particularly pointed out and distinctly claimed in the concluding portion of this specification. My invention itself however, together with further objects and advantages thereof, may best be understood by reference to the following description taken in conjunction with the accompanying drawing.

BRIEF DESCRIPTION OF THE DRAWING

FIG. 4 is a bottom view of a completed exemplary six pole stator;

FIG. 5 is a top view of the exemplary six pole stator of FIG. 4;

Figure 1:
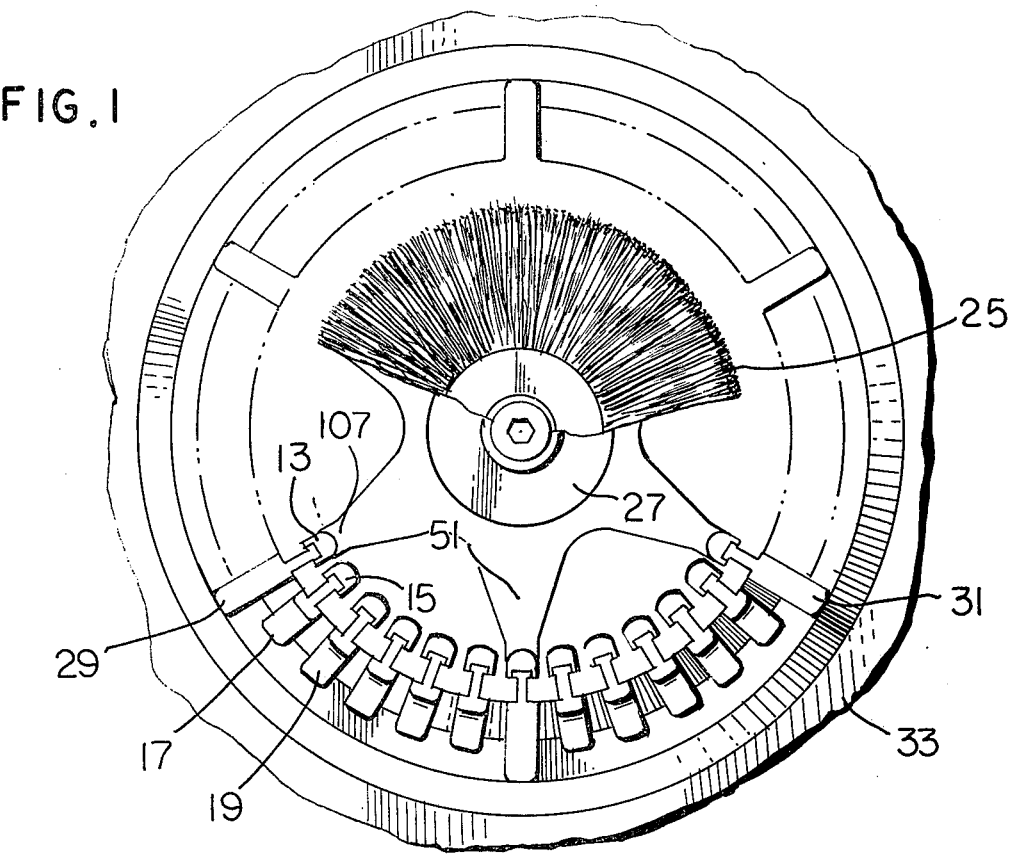
FIG. 1 is a top view of a coil inserting device, according to the present invention.
Figure 3:
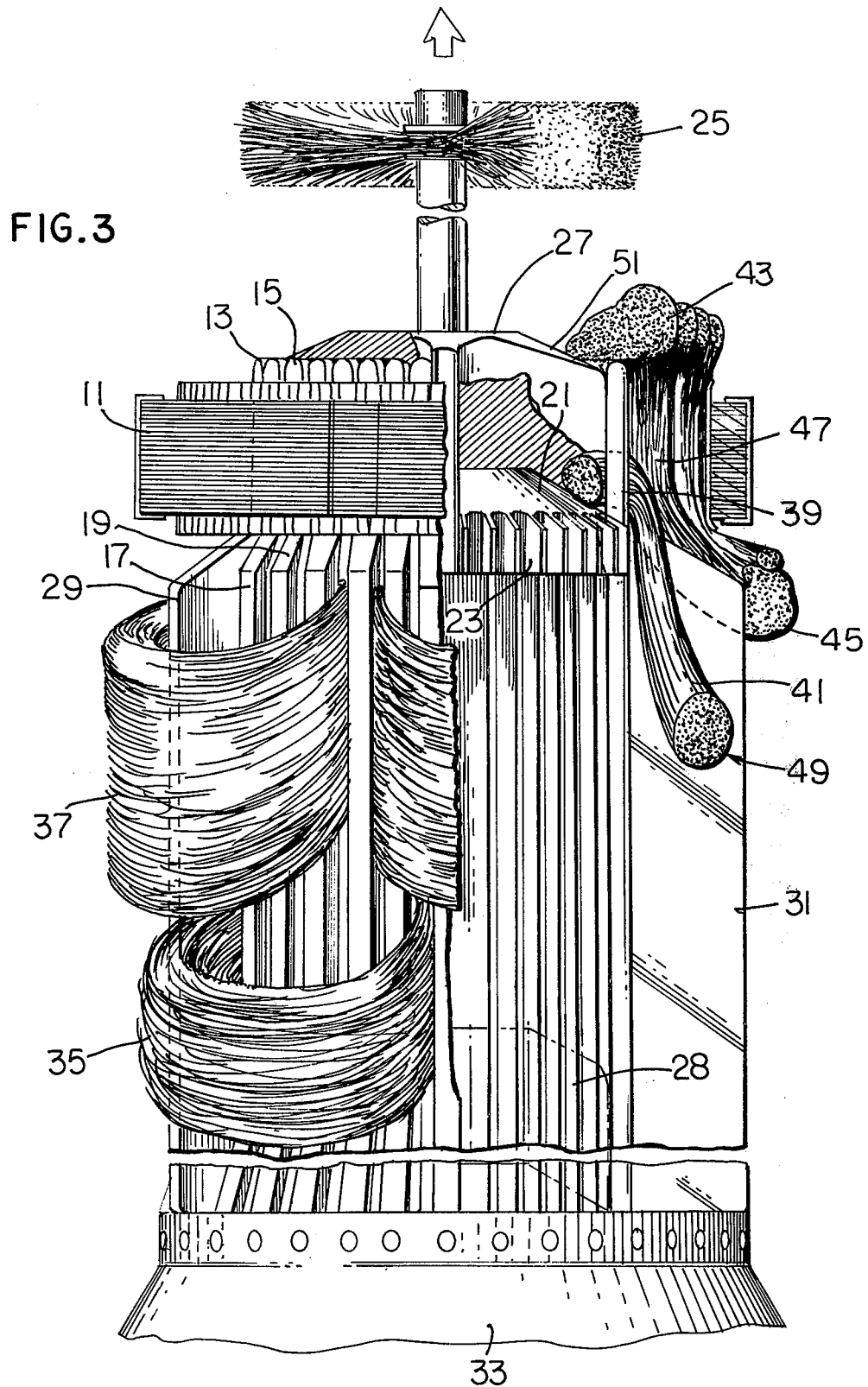
FIG. 3 is a side view partially in cross section illustrating the same various stages of the insertion process as shown in FIG. 2.

DESCRIPTION OF THE PREFERRED EMBODIMENT:

Considering first, primarily FIGS. 1 and 3, the machine for inserting coils of wire into slots of a dynamoelectric machine stator core 11, has a plurality of elongated finger members, such as 13 and 15, upstanding about the circumference of a circle corresponding substantially to the stator core bore. The outward faces of the finger members 13 and 15, are contoured to mate with the inner tooth portion of the stator core so that the gap between adjacent fingers corresponds to a slot in the stator core and coils of wire may be moved upward along the fingers and into corresponding slots. The lower portions of the elongated members such as 17 and 19 form between adjacent ones, a guide path for the insertion along with coils of insulating wedges which may for example, be wedges which separate the coil in the stator, from the stator bore (commonly called bore insulating wedges) or they may be insulating wedges for separating different windings in the stator slot. The machine also employs a stripper 21, which is movable axially through the stator bore to push coils through the bore and outwardly into the core slots. Typically such a stripper will have fins 23 which extend between adjacent fingers and into the stator slots for insuring that all of the wire is pushed into stator slots. As thus far described, the coil inserting machine is of standard construction and reference may be had to the aforementioned Hill patent for a more complete description of its operation.

Supported on and movable with the stripper 21, are a brush 25, for retaining uppermost wires of a coil to prevent wires from springing upward out from between the finger members and a riser structure 27, which is movable through the stator bore ahead of the stripper 21, for urging a leading coil through the bore somewhat ahead of a following coil. Certain of the wedge guides or lower portions of the finger elements are seen to have radially extended portions or protuberances such as 29 and 31, for urging a trailing portion of a leading coil radially outwardly to aid in providing clearance for following coils. The wedge guides may be fabricated integral with the upper finger portions such as 13 and 15, or more typically may be made as separate pieces with both the fingers and wedge guides mounted on a frame portion 33.

In the illustrated exemplary embodiment, the system inserts windings in one coil inserting axial pass through the stator bore, to provide a six pole stator having six main or running coils which lead the other winding upwardly into the stator and ultimately form an outer winding in the stator and having six start or auxiliary windings which follow the leading winding upwardly into the stator and ultimately reside as an interior winding in the stator. One pole for the stator may comprise a single coil disposed in a pair of stator slots or a group of coils disposed in different, but closely aligned stator slots and thus the winding for one pole is generically termed a coil group with, in the exemplary embodiment six coil groups connected together to form a complete winding.

In operation an inner or lower coil or group of coils such as 35, is placed over a number of the upstanding fingers and an upper or outer coil such as 37, is then placed over different ones of the fingers so that the coils 35 and 37 overlap. In this sense, the two coils overlap whenever they have sides between a common pair of finger elements or when one side of one of the coils lies between the finger elements encompassing the two sides of the other coil. At this time a stripper and riser are in their lowered position as at 28. The coils are then moved into the bore and slots of the stator core 11, by the upward progression of the brush 25, riser 27 and stripper 21, in the manner illustrated on the right hand portion of FIGS. 2 and 3. As illustrated the leading end turn forming portion 39, of an inner coil 41, lies intermediate the end turn forming portions 43 and 45 of an outer coil 47, and the trailing end turn forming portion 45, of the outer coil 47 is intermediate the end turn forming portions 39 and 49 of the inner coil 41. Thus the inner and outer coils are overlapping in the axial direction as well as being overlapping in the radial direction about the stator core. Coil 47, leads coil 41, because the radially extending riser portion 51, engages the coil 47, urging it upwardly, but however, passes between the coil 41 and its adjacent following coil leaving those following coils to be moved by the stripper 21. As seen in FIG. 3, for the exemplary six pole machine, there will be six such radially extending riser portions carried by the stripper. The frictional retardation of the insertion of the coil 41, (which may be accompanied by appropriate bore insulating wedges) is alleviated by urging the trailing end portion 45 of the outer or leading coil 47, radially outward so as to aid in providing clearance for the insertion of the inner coil 41, and of course its adjacent coil. This trailing end turn portion is urged outwardly by the radially extending portion 31.

Figure 6:
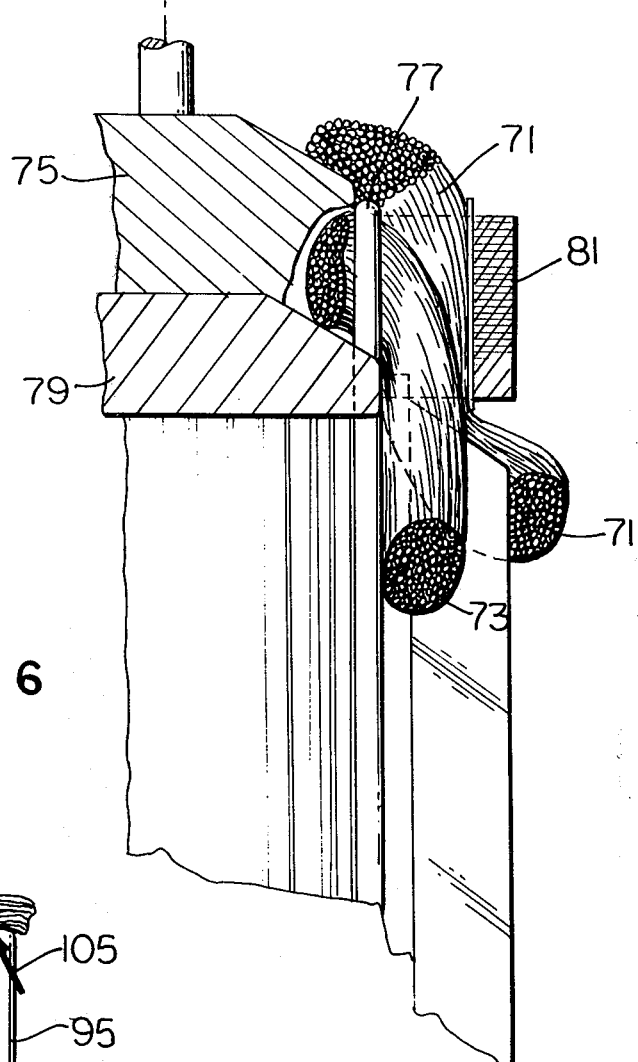
FIG. 6 is a partial side section view illustrating the windings partially inserted.

The lag between main and auxiliary winding insertion may be seen more clearly in FIG. 6 where main winding 71 is leading auxiliary winding 73 by a substantial amount. The riser structure 75 is pushing the upper end turns of main winding 71 over the ends of blades such as blade or finger 77 while the stripper 79 is inserting the trailing auxiliary winding 73 into the stator 81.

Figure 2:
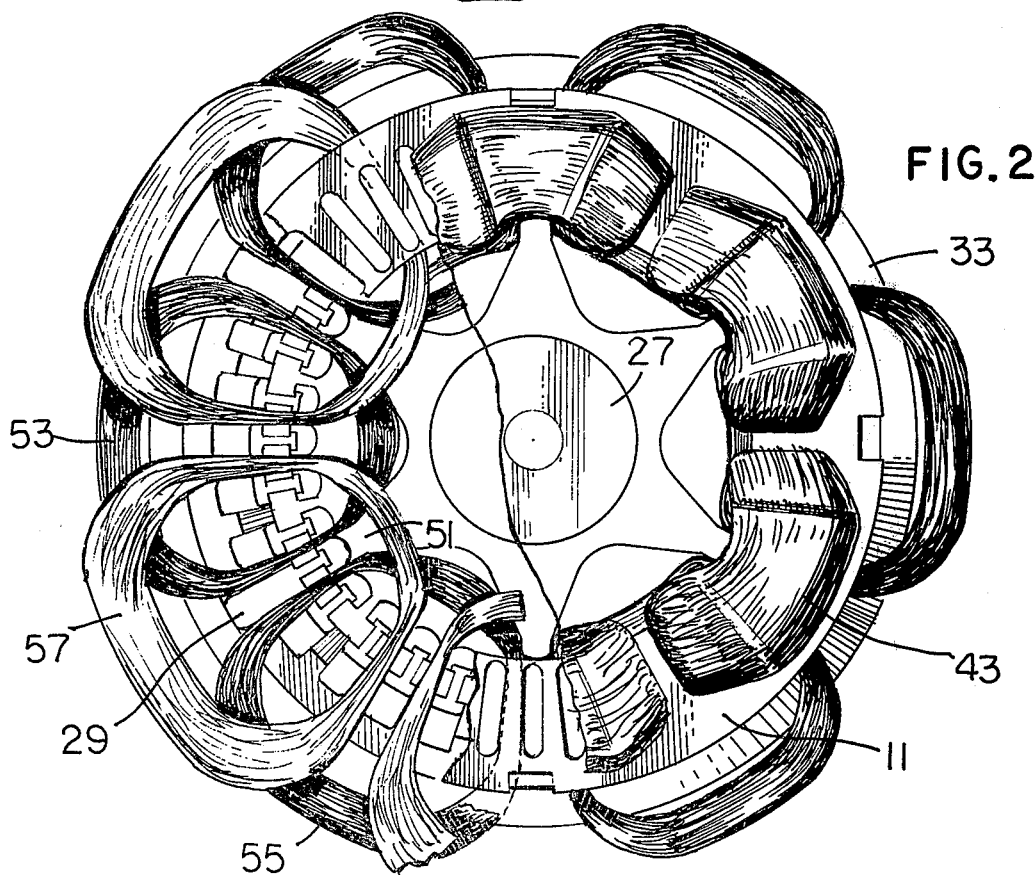
FIG. 2 is a top view similar to FIG. 1 illustrating overlapping coils and a stator in various stages of the insertion process.

Each pole of the stator may be formed by a single coil to be placed in a pair of stator slots or may be formed by a pole coil group (generally concentric) to be inserted in several stator slots, but in any event as illustrated in FIG. 2, the radially extending portion 51, of the riser will be aligned with the radially extending portion 29, supported on the frame and these portions will lie between two adjacent coils 53 and 55, so that the riser 51, engages the leading portion of the coil 57, leading it into the stator ahead of the coils such as 53 and 55 and further assuring that the trailing end turn portion of coil 57, will be urged outwardly by the radially extending portion 29, to allow adequate clearance for the completion of the insertion of coils 53 and 55, along with insulating wedges as desired.

Figure 7:
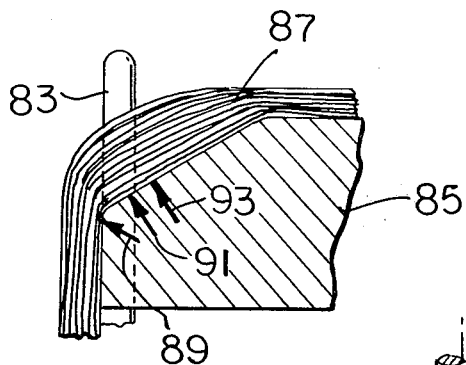
FIG. 7 is a simplified cross-sectional view illustrating conventional insertion.

The simplified comparison illustrated in FIGS. 6 and 7 will serve to clarify further some of the advantages of the present invention. In FIG. 7 the stripper 85 moves upwardly to force an exemplary coil 87 between a pair of fixed blades or fingers of which only finger 83 is visible. With this conventional stripper operation, the stripper 85 exerts forces on the coil 87 primarily in the region of the arrows 89, 91 and 93 and with the forces concentrated in this region, considerable damage to the lower turns of the coil 87 may result. By employing the riser 95 on top of the stripper 97, in FIG. 8, some of the forces on the coil 99 still occur in the region between blades, such as blade 101 as illustrated by the force arrow 103, however a considerable portion of the force required to insert the coil 99 now occurs as illustrated by force arrow 105 in the region where the riser engages coil 99 and since no fingers are present in this region, bunching of the turns does not give rise to any locking wire size problems.

With the proper height and configuration of the riser 95, a higher number of turns of wire within the locking wire size region may be inserted into a slot. This locking wire size condition is caused by a bridging action of the turns of wire between the blades. Wire diameters from approximately 55% to 78% of the blade gap are usually extensively damaged when inserting more than 30 to 35 turns of wire in a slot by the conventional approach illustrated in FIG. 7. The lower most turns next to the stripper become wedged and flattened as two wires are squeezed side by side between the two adjacent blades.

Figure 8:
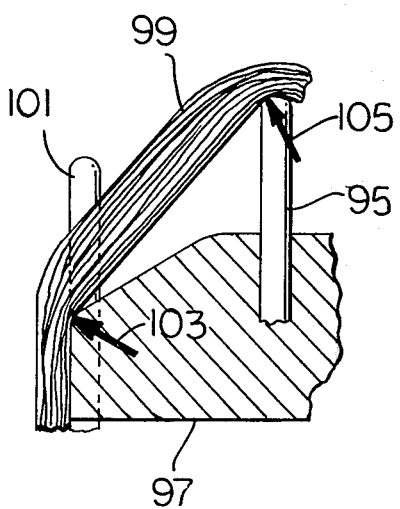
FIG. 8 is a view similar to FIG. 7 but illustrating insertion using the riser of the present invention.

The cause of this locking condition is the frictional component of force from one wire against the blade transmitted to the wire underneath adding to its sideways component resulting in progressively more force and flattening as the number of turns is increased. When using the conventional stripper of FIG. 7, the fin of the stripper is pushing upward on the coils and most damage occurs to the turns immediately adjacent to the stripper with correspondingly less damage to the higher turns as well as, of course, less damage for a lesser number of turns. With the coil assist riser on top the stripper, as illustrated in FIG. 8, the upper end turns of wire are in effect pulled up between the blades rather than pushed up entirely by the stripper fin between the blades. Employing such a riser allows the insertion of a considerably larger number of turns than without the riser and 60 or more turns of wire may be satisfactorily inserted in this manner.

In the exemplary six pole stator, the outer coils form the main or running winding whereas the inner coils form the auxiliary or start winding and the right hand portions of FIGS. 2 and 3 illustrate the completion of the insertion of the main winding but the as yet incomplete insertion of the start winding. The continued upward movement of the stripper 21, for, for example, another inch, will complete the insertion of the start winding providing a stator as illustrated in FIGS. 4 and 5 appearing much like conventionally fabricated stators and having bottom main end turns 59, top main end turns 61, top auxiliary or start end turn turns 63 and bottom start end turns 65. The auxiliary winding appears conventional however, it will be noted that the top main windings are depressed outwardly at 67, due to the passage of the riser 51, and the bottom main end turns are depressed or maintained outwardly at 69 due to their having been maintained or urged outwardly by the radially extending members such as 29 and 31.

Returning briefly to FIG. 1, it will be noted that contrary to conventional riser construction, the riser tips such as 107, which are the most radially outward portions of the riser, are contoured to closely mate with adjacent fingers such as 13. As illustrated the inwardly facing edge of the finger is convex and the outwardly facing tip of the riser 107 is concave, so as to leave no gaps into which turns of wire might fall, causing resulting wire damage, and possible machine damage.

Thus while the present invention has been described with respect to a specific embodiment numerous modifications will suggest themselves to those of ordinary skill in the art.

For example, while the protuberances which urge the trailing portion of the main winding radially outwardly have been illustrated simply as extended wedge guides, such protuberances could be provided by many different radially extending structures. Numerous variations on coil winding and inserting equipment may be employed in conjunction with the present invention. These and numerous other modifications will readily suggest themselves to those of ordinary skill in the art and accordingly the scope of the present invention is to be measured only by that of the appended claims.

I claim:

1. In a machine for inserting coils of wire into slots of a dynamoelectric machine stator core having a plurality of elongated members upstanding about the circumference of a circle for supporting the coils, and a stripper movable axially through the stator bore to push the coils through the bore and outwardly into the core slots, an improvement for the contemporaneous insertion of at least a leading coil and an overlapping following coil, each of said coils having a leading and a trailing end turn, comprising means movable through the bore ahead of the stripper for urging the leading coil through the bore somewhat ahead of the following coil, and radially extending means for engaging and urging the trailing end turn of the leading coil radially outwardly to aid in providing clearance for the following coil.

2. The improvement of claim 1 wherein the dynamoelectric machine stator is an N-pole stator, the machine contemporaneously inserting N main pole coil groups and N start pole coil groups with each of the N start groups following and overlapping an adjacent pair of main pole groups.

3. The improvement of claim 2 wherein the radially extending means comprises N radially extending protuberances, each positioned to lie radially outward of a corresponding one of said elongated members between adjacent start coil groups.

4. The improvement of claim 3 wherein the movable comprises N radially extending risers, each supported on the stripper and positioned radially inward of a corresponding one of said elongated members between adjacent start coil groups.

5. The improvement of claim 1 wherein the elongated members are fixedly supported on a machine frame and in turn support a stator core, the radially extending means comprising a plurality of radially extending protuberances supported on the machine frame.

6. The improvement of claim 1 wherein the movable means comprises a plurality of radially extending risers supported on and movable with the stripper.

7. The improvement of claim 1 wherein the movable means and the radially extending means each extend radially in a direction to intersect the leading coil and to pass a side of the following coil.

8. The method of inserting coils of wire into slots of a dynamoelectric machine stator core to form in one coil inserting axial pass through the bore of the core, a dynamoelectric machine stator having overlapping windings disposed in slots of the stator core and extending therefrom at opposite stator ends to form end turns comprising the steps of:
  providing a plurality of upstanding finger members;
  placing an inner coil over a number of the fingers;
  placing an outer coil over different ones of the fingers so that the outer and inner coils overlap;
  placing a stator core over the fingers so that stator core slots align with gaps between fingers;
  moving the inner and outer coils into the bore and slots of the stator core with a leading end turn forming portion of the inner coil intermediate end turn forming portions of the outer coil and a trailing end turn forming portion of the outer coil intermediate end turn forming portions of the inner coil; and
  engaging and urging the trailing end turn portion of the outer coil radially outward to aid in providing clearance for the insertion of the inner coil.

9. The method of claim 8 comprising the further step of moving bore insulating wedges into the stator core slots to separate the coils from the stator bore contemporaneously with the moving of the inner and outer coils.

10. Apparatus for assembling coils into the slots of stators and the like comprising a plurality of radially extending risers movable through a stator bore to lead a like plurality of pole coil groups into stator slots, and a further like plurality of radially extending stationary protuberances for engaging and urging trailing end turns of the coils radially outwardly to provide space for other coils.

11. In a machine for inserting coils of wire into slots of a dynamoelectric machine stator core to form a dynamoelectric machine stator having overlapping windings disposed in slots of the core and extending therefrom at opposite stator ends to form end turns, the machine having a plurality of elongated members upstanding about the periphery of a circle for supporting the coils, and a stripper movable axially through the stator bore to push the coils through the bore and outwardly into the core slots, an improvement for the contemporaneous insertion of inner and outer overlapping coils during a single stripper pass through the stator bore comprising stationary radially extending means for engaging and urging trailing end turns of the outer coil radially outward to aid in providing clearance for the inner coil.

12. The improvement of claim 11 further comprising means movable through the bore ahead of the stripper for urging the outer coil through the bore somewhat ahead of the inner coil so that the outer coil is leading and the inner coil following during insertion.

13. The improvement of claim 12 wherein the dynamoelectric machine stator is an N-pole stator, the machine contemporaneously inserting N main pole coil groups and N start pole coil groups with each of the N start groups following and overlapping an adjacent pair of main pole groups.

14. The improvement of claim 13 wherein the radially extending means comprises N radially extending protuberances, each positioned to lie radially outward of a corresponding one of the elongated members between adjacent start coil groups.

15. The improvement of claim 14 wherein the movable means comprises N radially extending risers each supported on the stripper and positioned radially inward of a corresponding one of the elongated members between adjacent start coil groups.

16. The improvement of claim 12 wherein the elongated members are fixedly supported on a machine frame and in turn support a stator core, the radially extending means comprising a plurality of radially extending protuberances supported on the machine frame.

17. The improvement of claim 12 wherein the movable means comprises a plurality of radilly extending risers supported on and movable with the stripper.

18. The improvement of claim 12 wherein the movable means and the radially extending means each extend radially in a direction to intersect the leading coil and to pass a side of the following coil.

19. In a machine for inserting coils of wire into slots of a dynamoelectric machine stator core to form a stator having overlapping windings disposed in slots of the core and extending therefrom at opposite stator ends to form end turns, the machine having a plurality of elongated members upstanding about the periphery of a circle for supporting the coils and a stripper movable axially through the stator bore to push the coils through the bore and outwardly into the core slots, an improvement for the contemporaneous insertion of inner and outer overlapping coils during a single stripper pass through the stator bore comprising a lesser plurality of radially extending protuberances each positioned to lie radially outward of a corresponding one of said elongated members for engaging and urging trailing end turns of the outer coil radially outward to aid in providing clearance for the inner coil.

* * * * *

UNITED STATES PATENT AND TRADEMARK OFFICE
CERTIFICATE OF CORRECTION

PATENT NO. : 3949464
DATED : April 13, 1976
INVENTOR(S) : Robert G. Walker

It is certified that error appears in the above-identified patent and that said Letters Patent are hereby corrected as shown below:

Col. 7, line 4, "means" omitted after "movable"
   Claim 4

Signed and Sealed this

Thirteenth Day of July 1976

[SEAL]

Attest:

RUTH C. MASON
Attesting Officer

C. MARSHALL DANN
Commissioner of Patents and Trademarks